United States Patent [19]

Moini

[11] Patent Number: 5,155,076

[45] Date of Patent: Oct. 13, 1992

[54] VACANCY TITANATES INTERCALATED WITH CATIONIC HYDROXY ALUMINUM COMPLEXES

[75] Inventor: Ahmad Moini, Lawrenceville, N.J.

[73] Assignee: Mobil Oil Corp., Fairfax, Va.

[21] Appl. No.: 636,856

[22] Filed: Jan. 2, 1991

[51] Int. Cl.$^5$ ............................................... B01J 29/06
[52] U.S. Cl. ..................................... 502/63; 502/242; 502/84; 502/308; 502/309; 502/349; 585/417; 423/628; 423/608
[58] Field of Search .................... 502/63, 84, 308, 309, 502/242, 349; 423/625, 608, 111, 69; 585/417

[56] References Cited

U.S. PATENT DOCUMENTS

| | | | |
|---|---|---|---|
| 4,176,090 | 11/1979 | Vaughan et al. | 502/63 |
| 4,248,739 | 2/1981 | Vaughan et al. | 502/63 |
| 4,831,005 | 5/1989 | Aufdembrink | 502/242 |
| 4,933,310 | 6/1990 | Aufdembrink et al. | 502/71 |
| 4,935,573 | 6/1990 | Aufdembrink et al. | 585/417 |

FOREIGN PATENT DOCUMENTS 63-251490 10/1988 Japan.
WO88/00090 1/1988 PCT Int'l Appl..

OTHER PUBLICATIONS

S. Cheng et al, "Pillaring of Layered Titanates by Polyoxo Cations of Aluminum", Inorg. Chem. (1989), vol. 28, pp. 1283–1289.

*Primary Examiner*—Theodore Morris
*Assistant Examiner*—Edward Squillante
*Attorney, Agent, or Firm*—Alexander J. McKillop; Charles J. Speciale; Edward F. Kenehan, Jr.

[57] ABSTRACT

There is provided a vacancy titanate intercalated with a cationic hydroxy aluminum complex, such as Keggin ion. A method for making this material and a process for using this material as a catalyst are also provided.

5 Claims, No Drawings

VACANCY TITANATES INTERCALATED WITH CATIONIC HYDROXY ALUMINUM COMPLEXES

BACKGROUND

There is provided a vacancy titanate intercalated with a cationic hydroxy aluminum complex, such as a Keggin ion. A method for making this material and a process for using this material as a catalyst are also provided.

Many layered materials are known which have three-dimensional structures which exhibit their strongest chemical bonding in only two dimensions. In such materials, the stronger chemical bonds are formed in two-dimensional planes and a three-dimensional solid is formed by stacking such planes on top of each other. However, the interactions between the planes are weaker than the chemical bonds holding an individual plane together. The weaker bonds generally arise from interlayer attractions such as Van der Waals forces, electrostatic interactions, and hydrogen bonding. In those situations where the layered structure has electronically neutral sheets interacting with each other solely through Van der Waals forces, a high degree of lubricity is manifested as the planes slide across each other without encountering the energy barriers that arise with strong interlayer bonding. Graphite is an example of such a material. The silicate layers of a number of clay materials are held together by electrostatic attraction mediated by ions located between the layers. In addition, hydrogen bonding interactions can occur directly between complementary sites on adjacent layers, or can be mediated by interlamellar bridging molecules.

Laminated materials such as clays may be modified to increase their surface area. In particular, the distance between the interlamellar layers can be increased substantially by absorption of various swelling agents such as water, ethylene glycol, amines, ketones, etc., which enter the interlamellar space and push the layers apart. However, the interlamellar spaces of such layered materials tend to collapse when the molecules occupying the space are removed by, for example, exposing the clays to high temperatures. Accordingly, such layered materials having enhanced surface area are not suited for use in chemical processes involving even moderately severe conditions.

The extent of interlayer separation can be estimated by using standard techniques such as X-ray diffraction to determine the basal spacing, also known as "repeat distance" or "d-spacing". These values indicate the distance between, for example, the uppermost margin of one layer with the uppermost margin of its adjoining layer. If the layer thickness is known, the interlayer spacing can be determined by subtracting the layer thickness from the basal spacing.

Various approaches have been taken to provide layered materials of enhanced interlayer distance having thermal stability. Most techniques rely upon the introduction of an inorganic "pillaring" agent between the layers of a layered material. For example, U.S. Pat. No. 4,216,188 incorporated herein by reference discloses a clay which is cross-linked with metal hydroxide prepared from a highly dilute colloidal solution containing fully separated unit layers and a cross-linked agent comprising a colloidal metal hydroxide solution. However, this method requires a highly dilute forming solution of clay (less than 1g/1) in order to effect full layer separation prior to incorporation of the pillaring species, as well as positively charged species of cross linking agents. U.S. Pat. No. 4,248,739, incorporated herein by reference, relates to stable pillared interlayered clay prepared from smectite clays reacted with cationic metal complexes of metals such as aluminum and zirconium. The resulting products exhibit high interlayer separation and thermal stability.

U.S. Pat. No. 4,176,090, incorporated herein by reference, discloses a clay composition interlayered with polymeric cationic hydroxy metal complexes of metals such as aluminum, zirconium and titanium. Interlayer distances of up to 16A are claimed although only distances restricted to about 9A are exemplified for calcined samples. These distances are essentially unvariable and related to the specific size of the hydroxy metal complex.

Silicon-containing materials are believed to be a highly desirable species of intercalating agents owing to their high thermal stability characteristics. U.S. Pat. No. 4,367,163, incorporated herein by reference, describes a clay intercalated with silica by impregnating a clay substrate with a silicon-containing reactant such as an ionic silicon complex, e.g., silicon acetylacetonate, or a neutral species such as $SiCl_4$. The clay may be swelled prior to or during silicon impregnation with a suitable polar solvent such as methylene chloride, acetone, benzaldehyde, tri- or tetraalkylammonium ions, or dimethylsulfoxide. This method, however, appears to provide only a monolayer of intercalated silica resulting in a product of small spacing between layers, about 2–3 A as determined by X-ray diffraction.

U.S. Pat. No. 4,859,648 describes layered oxide products of high thermal stability and surface area which contain interlayer polymeric oxides such as polymeric silica. These products are prepared by ion exchanging a layered metal oxide, such as layered titanium oxide, with organic cation, to spread the layers apart. A compound such as tetraethylorthosilicate, capable of forming a polymeric oxide, is thereafter introduced between the layers. The resulting product is treated to form polymeric oxide, e.g., by hydrolysis, to produce the layered oxide product. The resulting product may be employed as a catalyst material in the conversion of hydrocarbons.

U.S. Pat. Nos. 4,831,005; 4,831,006 and 4,929,587, the entire disclosures of which are expressly incorporated herein by reference, describe various methods for intercalating layered materials termed titanometallate-type layered metal oxides, wherein each layer of the metal oxide has the general formula

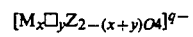

wherein M is at least one metal of valence n wherein n is an interger between 0 and 7, □ represents a vacancy site, Z is titanium, and wherein $q = 4y - x(n-4)$ $0 < x+y < 2$ These intercalating methods involve the placement of polymeric oxides, such as silica, between the layers of the layered material.

SUMMARY

There is provided a layered metal oxide material, wherein each layer of the metal oxide has the general formula

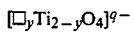

where $0<y<2$ and $q=4y$, said layered material being intercalated with a cationic hydroxy aluminum complex.

There is also provided a method for intercalating a layered metal oxide material, wherein each layer of the metal oxide has the general formula

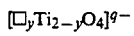

where $0<y<2$ and $q=4y$, said method comprising the steps of:
(i) swelling the said layered material by contacting said layered material with organoammonium cations; and
(ii) contacting the swollen layered material of step (i) with a cationic hydroxy aluminum complex.

There is further provided a process for converting an organic compound, said process comprising contacting an organic compound under sufficient conversion conditions with a layered metal oxide material, wherein each layer of the metal oxide has the general formula

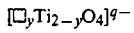

where $0<y<2$ and $q=4y$, said layered material being intercalated with a cationic hydroxy aluminum complex.

EMBODIMENTS

The present invention takes advantage of a direct pillaring procedure under aqueous conditions to form alumina-vacancy titanate products. The X-ray patterns for phases with high alumina contents clearly show d-spacings at approximately 15 Angstroms corresponding to the vacancy titanate layers separated by the alumina particles. The phases containing low amounts of alumina (<10%Al), however, form very disordered structures (virtually X-ray amorphous; lacking a peak at approximately 15 Angstroms) with higher surface areas and sorption capacities. The latter group of materials are unique because they are not representative of classical pillared products as judged from their X-ray patterns. This latter group of materials may have less than 10 wt % of A, e.g., from 5 to 8 wt % of Al, as measured by elemental analysis.

The layered materials, which may be intercalated by methods described herein, are described in copending U.S. application Ser. No. 587,481, filed Sep. 21, 1990, and in PCT International Publication Number WO88/00090, published Jan. 14, 1988, as well as in the aforementioned U.S. Pat. Nos. 4,831,005; 4,831,006 and 4,929,587. The layered materials described in these disclosures comprise a layered metal oxide, wherein each layer of the metal oxide has the general formula

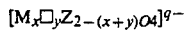

wherein M is at least one metal of valence n wherein n is an integer between 0 and 7 and preferably is 2 or 3, □ represents a vacancy site, Z is a tetravalent metal, preferably titanium, and wherein $q=4y-x(n-4)$ and preferably is 0.6–0.9, $0<x+y<2$ The layered materials, which are intercalated in accordance with the present disclosure, correspond to the materials of the above formula, wherein x is zero and Z is Ti. Such materials are referred to herein as vacancy titanates.

It is to be appreciated that the term "layered" metal oxide is used herein in its commonly accepted sense to refer to a material which comprises a plurality of separate metal oxide layers which are capable of being physically displaced away from one another such that the spacing between adjacent layers is increased. Such displacement can be measured by X-ray diffraction techniques and/or by density measurements.

The present layered material may be made from a vacancy titanate starting material which contains anionic sites having interspathic cations associated therewith. Such interspathic cations may include hydrogen ion, hydronium ion and alkali metal cation.

More specifically, the present invention employs a layered metal oxide starting material in which each layer has the general formula

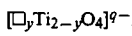

where $0<y<2$ and $q=4y$.

Interposed between the layers of the oxide will be charge-balancing cations A of charge m wherein m is an integer between 1 and 3, preferably 1. Preferably A is a large alkali metal cation selected from the group consisting of Cs, Rb and K. Structurally, these metal oxides consist of layers of $(\Box_y Ti_{1-y})O_6$ octahedra which are trans edge-shared in one dimension and cis edge-shared in the second dimension forming double octahedral layers which are separated by the A cations in the third dimension. These materials can be prepared by high temperature fusion of a mixture of 1) alkali metal carbonate or nitrate and 2) titanium dioxide. Such fusion can be carried out in air in ceramic crucibles at temperatures ranging between 600° to 1100° C. after the reagents have been ground to an homogeneous mixture. The resulting product is ground to 20 to 250 mesh, preferably about 100 mesh, prior to the organic swelling and intercalcation steps.

Further description of various titanometallate-type layered materials and their methods of preparation can be found in the following references:
Reid, A. F.; Mumme, W. G.; Wadsley, A. D. *Acta Cryst.* (1968), B24, 1228; Groult, D.; Mercy, C.; Raveau, B. *J. Solid State Chem.* 1980, 32 289; England, W. A.; Burkett, J. E.; Goodenough, J. B., Wiseman, P. J. *J. Solid State Chem.* 1983, 49 300. The infinite trans-edge shared layer structure of the vacancy titanates instead of the sheared 3-block structure of, for example, $Na_2Ti_3O_7$, or the sheared 4-block structure of, for example, $K_2Ti_4O_9$, may reduce or eliminate shearing of the layers as a possible mechanism for thermal or hydrothermal decomposition of the calcined intercalated material.

The layered metal oxide starting material may be initially treated with a "propping" agent comprising a source of organic cation, such as organoammonium cation, in order to effect an exchange of the interspathic cations resulting in the layers of the starting material being propped apart. Suitable organoammonium cations include such as n-dodecylammonium, n-octylammonium, n-heptylammonium, n-hexylammonium, n-butylammonium and n-propylammonium. During this propping or swelling step it is important to maintain a low hydrogen ion concentration to prevent decomposition of the vacancy titanate structure as well as to prevent preferential sorption of hydrogen ion over the propping agent. A pH range of 6 to 10, preferably 7 to 8.5 is generally employed during treatment with the propping agent.

The foregoing treatment results in the formation of a layered metal oxide of enhanced interlayer separation depending upon the size of the organic cation introduced. In one embodiment, a series of organic cation exchanges can be carried out. For example, an organic cation may be exchanged with an organic cation of greater size, thus increasing the interlayer separation in a step-wise fashion.

After the ion exchange, the organic-"propped" species may be treated with a solution of a cationic hydroxyaluminum complex. Such complexes and solutions thereof are described in U.S. Pat. No. 4,176,090, the entire disclosure of which is expressly incorporated herein by reference. These complexes may have the formula $Al_{2+n}(OH)_{3n}X_6$, wherein n has a value from 4 to 12 and X is selected from the group consisting of Cl, Br, $NO_3$ and $CO_3$. Up to about 10% of the aluminum of these complexes may be tetrahedrally coordinated, the remainder of the aluminum being octahedrally coordinated. An example of such a complex is a Keggin ion of the formula

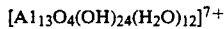

$$[Al_{13}O_4(OH)_{24}(H_2O)_{12}]^{7+}$$

It is preferred that the organic cation deposited between the layers be capable of being removed from the pillared material without substantial disturbance or removal of the interspathic aluminum. For example, organic cations such as n-octylammonium may be removed by exposure to elevated temperatures, e.g., calcination, in nitrogen or air, or by chemical oxidation.

These layered products, especially when calcined, exhibit high surface area and thermal and hydrothermal stability making them highly useful as catalysts or catalytic supports, for hydrocarbon conversion processes.

After calcination to remove the organic propping agent, the final pillared product may contain residual exchangeable cations. Such residual cations in the layered material can be ion exchanged by known methods with other cationic species to provide or alter the catalytic activity of the pillared product. Suitable replacement cations include cesium, cerium, cobalt, nickel, copper, zinc, manganese, platinum, lanthanum, aluminum, ammonium, hydronium and mixtures thereof.

The layered material catalyst described herein can optionally be used in intimate combination with a hydrogenating component such as tungsten, vanadium, molybdenum, rhenium, nickel, cobalt, chromium, manganese, or a noble metal such as platinum or palladium where a hydrogenation-dehydrogenation function is to be performed. Such component can be exchanged into the composition, impregnated therein or intimately physically admixed therewith. Such component can be impregnated in, or on, the layered material such as, for example, by, in the case of platinum, treating the layered material with a solution containing a platinum metal-containing ion. Thus, suitable platinum compounds for this purpose include chloroplatinic acid, platinous chloride and various compounds containing the platinum amine complex.

The layered material may be subjected to thermal treatment, e.g., to decompose organoammonium ions. This thermal treatment is generally performed by heating one of these forms at a temperature of at least about 370° C. for at least 1 minute and generally not longer than 20 hours. While subatmospheric pressure can be employed by the thermal treatment, atmospheric pressure is preferred simply for reasons of convenience.

Prior to its use in organic conversion processes described herein, the layered material catalyst should usually be dehydrated, at least partially. This dehydration can be done by heating the crystals to a temperature in the range of from about 200° C. to about 595° C. in an atmosphere such as air, nitrogen, etc., and at atmospheric, subatmospheric or superatmospheric pressures for between about 30 minutes and to about 48 hours. Dehydration can also be performed at room temperature merely by placing the layered material in a vacuum, but a longer time is required to obtain a sufficient amount of dehydration.

The layered material catalyst can be shaped into a wide variety of particle sizes. Generally speaking, the particles can be in the form of a powder, a granule, or a molded product such as an extrudate having a particle size sufficient to pass through a 2 mesh (Tyler) screen and be retained on a 400 mesh (Tyler) screen. In cases where the catalyst is molded, such as by extrusion, the layered material can be extruded before drying or partially dried and then extruded.

It may be desired to incorporate the layered material with another material which is resistant to the temperatures and other conditions employed in the catalytic processes described herein. Such materials include active and inactive materials and synthetic or naturally occurring zeolites as well as inorganic materials such as clays, silica and/or metal oxides such as alumina. The latter may be either naturally occurring or in the form of gelatinous precipitates or gels including mixtures of silica and metal oxides. Use of a material in conjunction with layered material, i.e., combined therewith or present during its synthesis, which itself is catalytically active may change the conversion and/or selectivity of the catalyst. Inactive materials suitably serve as diluents to control the amount of conversion so that products can be obtained economically and orderly without employing other means for controlling the rate of reaction. These materials may be incorporated into naturally occurring clays, e.g., bentonite and kaolin, to improve the crush strength of the catalyst under commercial operating conditions. Said materials, i.e., clays, oxides, etc., function as binders for the catalyst. It is desirable to provide a catalyst having good crush strength because in commercial use, it is desirable to prevent the catalyst from breaking down into powder-like materials. These clay binders have been employed normally only for the purpose of improving the crush strength of the catalyst.

Naturally occurring clays which can be composited with layered materials include the montmorillonite and kaolin family, which families include the subbentonites, and the kaolins commonly known as Dixie, McNamee, Georgia and Florida clays or others in which the main mineral constituent is halloysite, kaolinite, dickite, nacrite, or anauxite. Such clays can be used in the raw state as originally mined or initially subjected to calcination, acid treatment or chemical modification. Binders useful for compositing with layered materials also include inorganic oxides, notably alumina.

In addition to the foregoing materials, the layered materials can be composited with a porous matrix material such as silica-alumina, silica-magnesia, silica-zirconia, silica-thoria, silica-beryllia, silica-titania as well as ternary compositions such as silica-alumina-thoria, silica-alumnna-zirconia, silica-alumina-magnesia and silica-magnesia-zirconia.

The relative proportions of finely divided layered materials and inorganic oxide matrix vary widely, with the layered material content ranging from about 1 to about 90 percent by weight and more usually, particularly when the composite is prepared in the form of beads, in the range of about 2 to about 80 weight of the composite.

The layered material of the present invention is useful as a catalyst component for a variety of organic, e.g. hydrocarbon, compound conversion processes. Such conversion processes include, as non-limiting examples, cracking hydrocarbons with reaction conditions including a temperature of from about 300° C. to about 700° C., a pressure of from about 0.1 atmosphere (bar) to about 30 atmospheres and a weight hourly space velocity of from about 0.1 to about 20; dehydrogenating hydrocarbon compounds with reaction conditions including a temperature of from about 300° C. to about 700° C., a pressure of from about 0.1 atmosphere to about 10 atmospheres and a weight hourly space velocity of from about 0.1 to about 20; converting paraffins to aromatics with reaction conditions including a temperature of from about 100° C. to about 700° C., a pressure of from 0.1 atmosphere to about 60 atmospheres, a weight hourly space velocity of from about 0.5 to about 400 and a hydrogen/hydrocarbon mole ratio of from about 0 to about 20; converting olefins to aromatics, e.g. benzene, toluene and xylenes, with reaction conditions including a temperature of from about 100° C. to about 700° C., a pressure of from about 0.1 atmosphere to about 60 atmospheres, a weight hourly space velocity of from about 0.5 to about 400 and a hydrogen/hydrocarbon mole ratio of from about 0 to about 20; converting alcohols, e.g. methanol, or ethers, e.g. dimethylether, or mixtures thereof to hydrocarbons including aromatics with reaction conditions including a temperature of from about 300° C. to about 550° C., more preferably from about 370° C. to about 500° C., a pressure of from about 0.01 psi to about 2000 psi, more preferably from about 0.1 psi to about 500 psi, and a liquid hourly space velocity of from about 0.5 to about 100; isomerizing xylene feedstock components with reaction conditions including a temperature of from about 230° C. to about 510° C., a pressure of from about 3 atmospheres to about 35 atmospheres, a weight hourly space velocity of from about 0.1 to about 200 and a hydrogen/hydrocarbon mole ratio of from about 0 to about 100; disproportionating toluene with reaction conditions including a temperature of from about 200° C. to about 760° C., a pressure of from about atmospheric to about 60 atmospheres and a weight hourly space velocity of from about 0.08 to about 20; alkylating aromatic hydrocarbons, e.g. benzene and alkylbenzenes, in the presence of an alkylating agent, e.g. olefins, formaldehyde, alkyl halides and alcohols, with reaction conditions including a temperature of from about 340° C. to about 500° C., a pressure of from about atmospheric to about 200 atmospheres, a weight hourly space velocity of from about 2 to about 2000 and an aromatic hydrocarbon/alkylating agent mole ratio of from about 1/1 to about 20/1; and transalkylating aromatic hydrocarbons in the presence of polyalkylaromatic hydrocarbons with reaction conditions including a temperature of from about 340° C. to about 500° C., a pressure of from about atmospheric to about 200 atmospheres, a weight hourly space velocity of from about 10 to about 1000 and an aromatic hydrocarbon/polyalkylaromatic hydrocarbon mole ratio of from about 1/1 to about 16/1.

In the Examples which follow, whenever sorption data are set forth for comparison of sorptive capacities for water, cyclohexane and/or n-hexane, they were equilibrium adsorption values determined as follows:

A weighted sample of the calcined adsorbent was contacted with the desired pure adsorbate vapor in an adsorption chamber, evacuated to less than 1 mm and contacted with 21 Torr of water vapor and 40 Torr of n-hexane or cyclohexane vapor, pressures less than the vapor-liquid equilibrium pressure of the respective adsorbate at 90° C. The pressure was kept constant (within about ±0.5 mm) by addition of adsorbate vapor controlled by a mamostat during the adsorption period, which did not exceed about 8 hours. As adsorbate was adsorbed by the layered material, the decrease in pressure caused the manostat to open a valve which admitted more adsorbate vapor to the chamber to restore the above control pressures. Sorption was complete when the pressure change was not sufficient to activate the manostat. The increase in weight was calculated as the adsorption capacity of the sample in g/100 of calcined adsorbant.

All of the following Examples utilized a vacancy titanate (VT) swelled by octylamine. The attempted composition was $Cs_{0.7}[]_{0.175}Ti_{1.825}O_4$ ($Cs_x[Ti_{2-(x/4)}[_{x/4}]O_4$, $[]$=vacancy, $x=0.7$), and was synthesized by high-temperature solid state reaction of $Cs_2CO_3$ and $TiO_2$. Stoichiometric amounts of the starting materials to give the above-mentioned attempted composition were thoroughly mixed by grinding, and the mixture was heated at 650° C. for 20 h. The mixture was ground and heated 3 to 4 times to ensure complete reaction. The ammonium exchange process was carried out by repeated refluxing of the above product in 1M $NH_4NO_3$. The $NH_4^+$-exchanged VT was swelled by refluxing the solid in octylamine (b.p. 175°–176° C.) for 24 hr.

EXAMPLE 1

$AlCl_36H_2O$(4.83 g) was dissolved in ca. 250 ml $H_2O$/EtOH (10:1) mixture. A second solution was prepared by adding 6.35 g octylamine to 50 ml of $H_2O$/EtOH (1:1) mixture. The amine solution as then added dropwise to the aluminum chloride solution. The resulting cloudy solution was aged for ca. 30 minutes, followed by the addition of 1.5 g octylamine-swelled VT. The mixture was heated to 70° C. while stirring. After 18 hr., the reaction was stopped, the mixture was centrifuged and washed 5 times followed by filtering the final solid and washing with more $H_2O$. The product was calcined at 500° C. The results of sorption and elemental analysis are summarized in Table 1.

The X-ray diffraction pattern of the calcined product showed a peak at approximately 15 Angstroms, corresponding to the separation of the titanate layers (7 Angstroms thick) by the hydroxyl aluminum species.

EXAMPLE 2

2.90 g of hydrated aluminumtrichloride, i.e. MicroDry (Aluminum Chlorhydrol, 46.2 % Al oxide, Reheis Chemical Company) was dissolved in ca. 25 ml H$_2$O. This solution was stirred for ca. 45 min. In a separate container, 1.0 g octylamine-swelled VT was mixed with ca. 25 ml H$_2$O. The first solution was added to the VT suspension dropwise. The final mixture was heated to 60° C. The reaction was stopped after 19 hr. The product was centrifuged and washed 3 times followed by filtering the final solid and washing with more H$_2$O. The product was calcined at 500° C. The results of sorption and elemental analysis are summarized in Table 1.

The X-ray diffraction pattern of the calcined product showed a peak at approximately 15 Angstroms, corresponding to the separation of the titanate layers (7 Angstroms thick) by the hydroxyl aluminum species.

EXAMPLE 3

0.55 g MicroDry (Aluminum Chlorhydrol, 46.2 % Al oxide, Reheis Chemical Company) was dissolved in ca. 15 ml H$_2$O. This solution was stirred for ca. 30 min. In a separate container, 1.9 g octylamine-swelled VT was mixed with ca. 50 ml H$_2$O. The first solution was added to the VT suspension dropwise. The final mixture was heated to 60.C The reaction was stopped after 42 hr. The product was centrifuged and washed 3 times followed by filtering the final solid and washing with more H$_2$O. The product was calcined at 500° C. The results of sorption and elemental analysis are summarized in Table 1.

The X-ray powder diffraction pattern did not contain a peak corresponding to the intercalated product indicating the formation of a disordered composite.

EXAMPLE 4

0.28 g MicroDry (Aluminum Chlorhydrol, 46.2 % Al oxide, Reheis Chemical Company) was dissolved in ca. 25 ml H$_2$O. This solution was stirred for ca. 30 min. In a separate container, 2.0 g octylamine-swelled VT was mixed with ca. 50 ml H$_2$O. The first solution was added to the VT suspension dropwise. The final mixture was heated to 60° C. The reaction was stopped after 17 hr. The product was centrifuged and washed 3 times followed by filtering the final solid and washing with more H$_2$O. The product was calcined at 500° C. The results of sorption and elemental analysis are summarized in Table 1.

The X-ray powder diffraction pattern did not contain a peak corresponding to the intercalated product indicating the formation of a disordered composite.

TABLE 1

Elemental Analysis and Sorption Data for Al-VT Products

| Sample | Al/c.e.s.$^a$ | % Al$^b$ | S.A.$^c$ | sorption capacity$^d$ |
|---|---|---|---|---|
| EXAMPLE 1 | 4.61 | 17.55 | 35. | 3.7 |
| EXAMPLE 2 | 9.13 | 15.88 | 67. | 6.6 |
| EXAMPLE 3 | 0.91 | 7.18 | 111. | 6.2 |
| EXAMPLE 4 | 0.44 | 6.16 | 101. | 7.4 |

$^a$Ratio of Al to the cation exchange sites in VT (during synthesis)
$^b$Aluminum content as determined by elemental analysis
$^c$BET surface area (m$^2$/g)
$^d$cyclohexane sorption (wt. %)

What is claimed is:

1. A layered metal oxide, wherein each layer of the metal oxide has the general formula $$[\square_y Ti_{2-y} O_4]^{-q}$$

where $\square$ represents a vacancy site, $0 < y < 2$ and $q = 4y$, said layered metal oxide being intercalated with a cationic hydroxy aluminum complex.

2. A layered metal oxide according to claim 1, wherein said cationic hydroxy aluminum complex is a Keggin ion.

3. A layered metal oxide according to claim 1, wherein up to about 10% of the aluminum of the cationic hydroxy aluminum complex is tetrahedrally coordinated.

4. A layered metal oxide according to claim 1, wherein the intercalated layered metal oxide comprises less than 10 wt % of Al and the X-ray diffraction pattern of this intercalated layered metal oxide does not have peak at 15 Angstroms.

5. A layered metal oxide according to claim 4, wherein the intercalated layered metal oxide comprises between 5 and 8 wt % of Al.

* * * * *